US008503653B2

(12) United States Patent
Ahuja et al.

(10) Patent No.: US 8,503,653 B2
(45) Date of Patent: Aug. 6, 2013

(54) METHOD AND APPARATUS FOR ACTIVE SPEAKER SELECTION USING MICROPHONE ARRAYS AND SPEAKER RECOGNITION

(75) Inventors: Sudhir Raman Ahuja, Little Silver, NJ (US); Jingdong Chen, North Plainfield, NJ (US); Yiteng Arden Huang, North Plainfield, NJ (US); Dong Liu, Piscataway, NJ (US); Qiru Zhou, Scotch Plains, NJ (US)

(73) Assignee: Alcatel Lucent, Paris (FR)

( * ) Notice: Subject to any disclaimer, the term of this patent is extended or adjusted under 35 U.S.C. 154(b) by 1499 days.

(21) Appl. No.: 12/074,276

(22) Filed: Mar. 3, 2008

(65) Prior Publication Data

US 2009/0220065 A1    Sep. 3, 2009

(51) Int. Cl.
*H04M 3/42* (2006.01)
*H04M 1/00* (2006.01)
*H04L 12/16* (2006.01)
*H04Q 11/00* (2006.01)

(52) U.S. Cl.
USPC ....... 379/202.01; 379/158; 370/260; 455/416

(58) Field of Classification Search
USPC ................. 379/202.01–206.01, 90.01, 93.01, 379/93.21, 157, 158, 201.01, 207.01; 370/259, 370/260, 261, 262; 455/414.1, 416
See application file for complete search history.

(56) References Cited

U.S. PATENT DOCUMENTS

| | | | | |
|---|---|---|---|---|
| 2002/0181686 | A1* | 12/2002 | Howard et al. | 379/202.01 |
| 2003/0158900 | A1* | 8/2003 | Santos | 709/205 |
| 2005/0094795 | A1* | 5/2005 | Rambo | 379/202.01 |
| 2005/0286664 | A1 | 12/2005 | Chen et al. | 375/346 |
| 2007/0260684 | A1* | 11/2007 | Sharma et al. | 709/204 |
| 2008/0043644 | A1* | 2/2008 | Barkley et al. | 370/261 |
| 2008/0049921 | A1* | 2/2008 | Davis et al. | 379/202.01 |
| 2009/0253418 | A1* | 10/2009 | Makinen | 455/416 |

OTHER PUBLICATIONS

Jacob Benesty, et al, "On Microphone-Array Beamforming From a MIMO Acoustic Signal Processing Perspective", *IEEE Transactions on Audio, Speech and Language Processing*, vol. 15, No. 3, Mar. 2007, pp. 1053-1065.
J. Capon, "High-Resolution Frequency-Wavenumber Spectrum Analysis", *Proceedings of the IEEE*, vol. 57, No. 8, Aug. 1969, pp. 1408-1418.
Henry Cox, et al, "Robust Adaptive Beamforming", *IEEE Transactions on Acoustics, Speech and Signal Processing*, vol. ASSP-35, No. 10, Oct. 1987, pp. 1365-1376.

(Continued)

*Primary Examiner* — Khai N Nguyen
(74) *Attorney, Agent, or Firm* — Wolff & Samson PC (57) ABSTRACT

A method and apparatus for performing active speaker selection in teleconferencing applications illustratively comprises a microphone array module, a speaker recognition system, a user interface, and a speech signal selection module. The microphone array module separates the speech signal from each active speaker from those of other active speakers, providing a plurality of individual speaker's speech signals. The speaker recognition system identifies each currently active speaker using conventional speaker recognition/identification techniques. These identities are then transmitted to a remote teleconferencing location for display to remote participants via a user interface. The remote participants may then select one of the identified speakers, and the speech signal selection module then selects for transmission the speech signal associated with the selected identified speaker, thereby enabling the participants at the remote location to listen to the selected speaker and neglect the speech from other active speakers.

20 Claims, 5 Drawing Sheets

OTHER PUBLICATIONS

Otis Lamont Frost III, "An Algorithm for Linearly Constrained Adaptive Array Processing", Proceedings of the IEEE, vol. 60, No. 8, Aug. 1972, pp. 926-935.

Sadaoki Furui, "Cepstral Analysis Technique for Automatic Speaker Verification", *IEEE Transactions on Acoustics, Speech and Signal Processing*, vol. ASSP-29, No. 2, Apr. 1981, pp. 254-272.

* cited by examiner

METHOD AND APPARATUS FOR ACTIVE SPEAKER SELECTION USING MICROPHONE ARRAYS AND SPEAKER RECOGNITION

FIELD OF THE INVENTION

The present invention relates generally to the field of telecommunications and more particularly to a method and apparatus for performing active speaker selection in audio teleconferencing applications.

BACKGROUND OF THE INVENTION

Teleconferencing can facilitate group collaboration, and therefore it has become a widely used form of telecommunications over the last several years, particularly as businesses have had to deal with conferences and meetings involving participants from geographically diverse locations. In a typical teleconferencing environment, a plurality of physical locations each involves one or more participants, most often using a single telecommunications device at each such location. Moreover, in locations (which will hereinafter be referred to as "rooms" or "conference rooms") where there is more than one participant, as well as in some locations where there is a single participant, the telecommunications device is most commonly operated in a "speakerphone" mode, wherein a microphone is used an "input" device for receiving the audio generated within the given room and a loudspeaker is used as an "output" device for broadcasting the audio received from other locations into the given room.

However, because each conference room allows multiple participants to join the conference, and because several participants may speak at the same time, speech acquisition and delivery becomes a very difficult and challenging problem. If each conference room is equipped with a single microphone and loudspeaker, then whenever there are multiple active speakers the speech signals from these different speakers will superimpose together. In such a superimposed signal, one speaker's signal interferes with signals from other active speakers. This will cause serious problems for the listeners who are sitting in remote rooms and trying to understand the speech from some particular, desired speaker. In addition, even if there is only one active speaker at a time, the microphone signal can be corrupted by noise and reverberation, leading to a significant degradation in speech quality and intelligibility.

One way that has been suggested for improving speech acquisition in a teleconferencing environment is with the use of microphone arrays, which are familiar to those of ordinary skill in the art. With the use of microphone arrays, a desired signal may be advantageously extracted from the cacophony of audio sounds using beamforming, or more generally spatiotemporal filtering techniques. Many beamforming techniques have been developed and will be fully familiar to those of ordinary skill in the art, including the more simple delay-and-sum approaches and the more sophisticated filter-and-sum algorithms.

As is fully familiar to those of ordinary skill in the art, the fundamental underlying idea of beamforming is to apply a filter to each microphone output and then sum the filtered microphone signals together to form one output. If each filter is properly designed, beamforming can significantly attenuate background noise, suppress interference from competing sources, and reduce reverberation. Therefore, with the use of a microphone arrays and beamforming techniques, we can separate signals from active speakers based on the mixed microphone observations. However, even though we can, in theory, separate speech from multiple active speakers, existing teleconferencing systems do not provide any method for selectively transmitting the separated signals. They either simply transmit the mixed signal (containing all active speakers) or arbitrarily pick up one active speaker's signal (e.g., the strongest) and send it to the remote locations. This traditional way of handling speech has many drawbacks. First, if the mixed signal is sent to the receiving rooms, the speech will in general have a very low quality and intelligibility because the multiple speakers will most certainly interfere with each other. Second, if the transmitting room arbitrarily isolates a signal from one active speaker (e.g., the loudest), this active speaker may not necessarily be the one that the remote participants want to hear. Moreover, participants located in a remote conference room may not in general be able to identify the current active speaker unless they are familiar with the speaker's voice.

SUMMARY OF THE INVENTION

The present invention advantageously provides a method and apparatus for participants in a teleconference to selectively listen to the speech from a desired active speaker. In accordance with an illustrative embodiment of the present invention, an apparatus for speaker selection comprises several parts: a microphone array module, a speaker recognition system, a user interface, and a speech signal selection module. The microphone array module advantageously separates the speech signal from each active speaker from those of the other active speakers, providing a plurality of individual speaker's speech signals. It also may advantageously perform noise and reverberation reduction on each of these signals to enhance speech quality and intelligibility. The speaker recognition system advantageously identifies each of the current active speakers. For example, conventional speaker recognition/identification techniques may be used to identify the speaker associated with each individual speech signal. These speakers' identities may then, for example, be transmitted to a remote location and displayed to each participant (or to a group of participants) via a user interface. The participant (or participant group) at the remote location may then advantageously select one of the identified speakers. The speech signal selection module then advantageously selects for transmission the speech signal associated with the selected identified speaker, thereby enabling the participant (or participant group) at the remote location to listen to the selected speaker and neglect the speech from the other active speakers.

BRIEF DESCRIPTION OF THE DRAWINGS

FIG. 4A shows an illustrative multiple beam-forming technique which may be employed in accordance with one illustrative embodiment of the present invention; and FIG. 4B shows an illustrative beam-scanning technique which may be employed in accordance with another illustrative embodiment of the present invention.

DETAILED DESCRIPTION OF THE PREFERRED EMBODIMENTS

Figure 1:
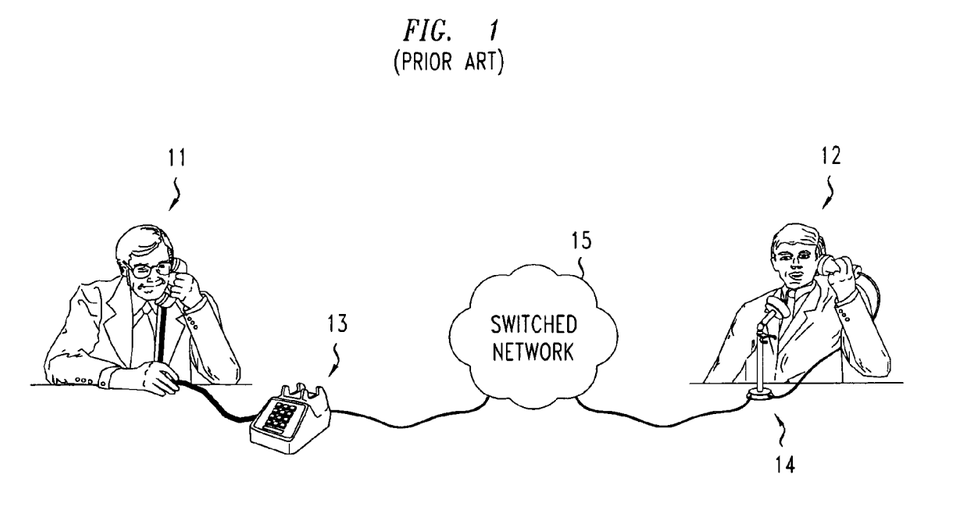
FIG. 1 shows a traditional voice communication over a circuit-switched telephone network.

FIG. 1 shows a traditional voice communication over a circuit-switched telephone network. In such a traditional system, participants 11 and 12 communicate "one on one" with use of conventional telephones 13 and 14, interconnected through conventional circuit-switched telephone network 15.

Figure 2:
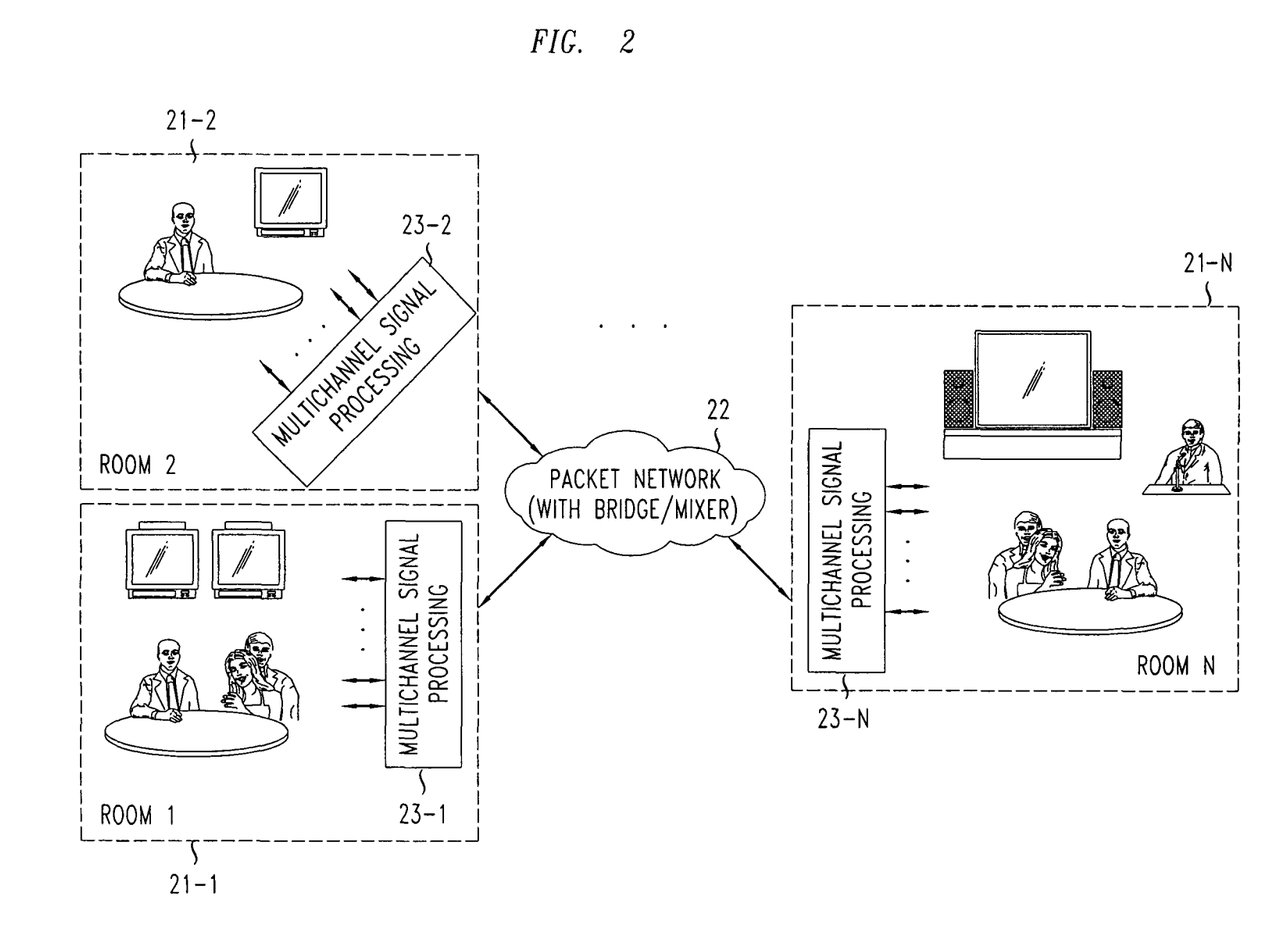
FIG. 2 shows a multimedia teleconferencing environment in which an illustrative embodiment of the present invention may be advantageously employed.

FIG. 2 shows a multimedia teleconferencing environment in which an illustrative embodiment of the present invention may be advantageously employed. The illustrative environment comprises N rooms, of which three—rooms 21-1, 22-2 and 22-N—are shown, along with packet-switched network 22 for providing telecommunication services therebetween. In particular, packet-switched network 22 advantageously comprises a bridge/mixer for supporting teleconferencing applications. Each room advantageously comprises multichannel signal processing circuits 23-1, 23-2, . . . , 23-N, respectively, each of which may, for example, comprise an apparatus for active speaker selection in accordance with an illustrative embodiment of the present invention.

Figure 3:
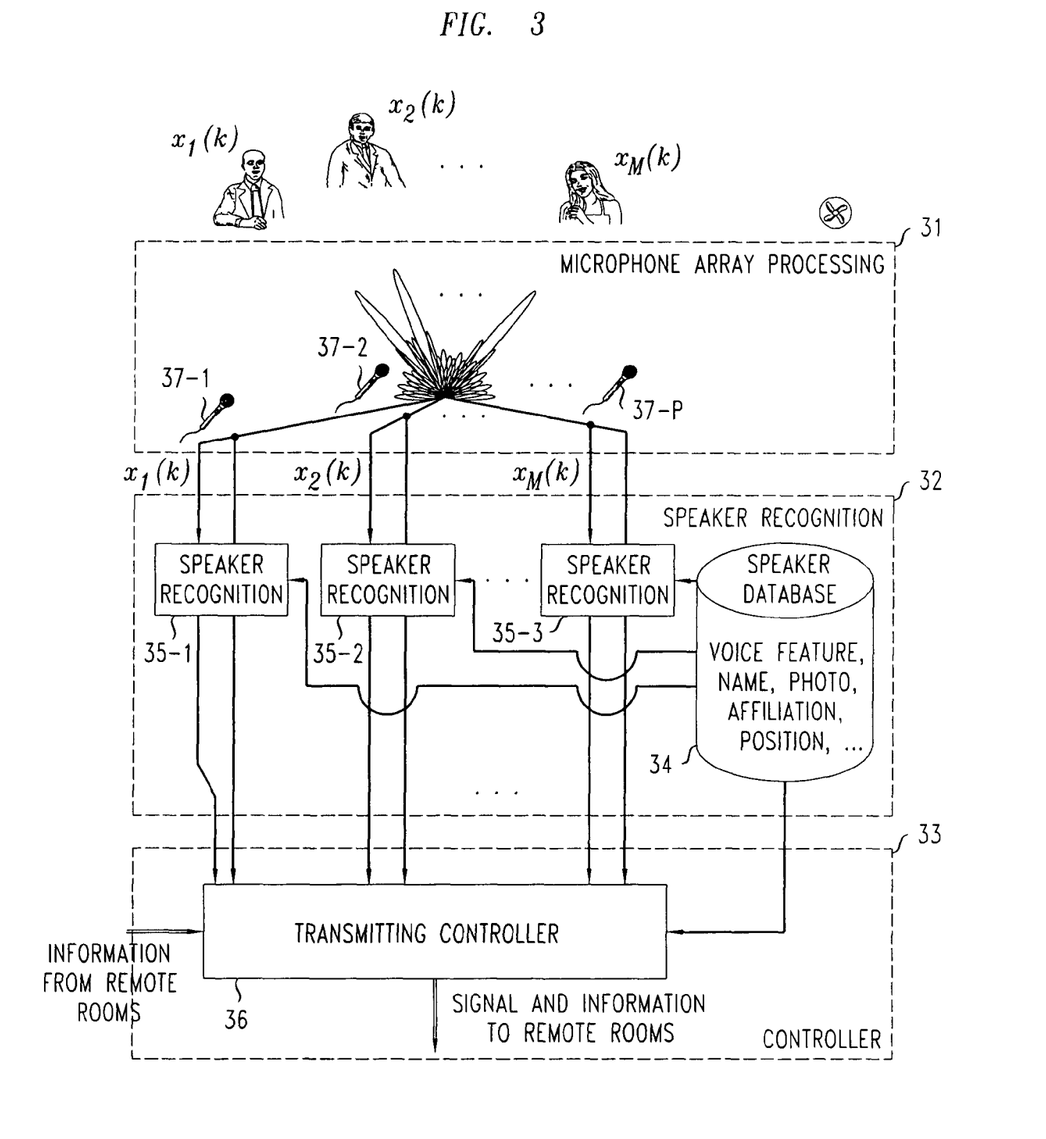
FIG. 3 shows a block diagram of an active speaker selection apparatus using a microphone array and speaker recognition techniques in accordance with an illustrative embodiment of the present invention.

FIG. 3 shows a block diagram of an illustrative active speaker selection apparatus using a microphone array and speaker recognition in accordance with an illustrative embodiment of the present invention. The illustrative apparatus shown in the figure advantageously comprises three major components—microphone array processing module 31, speaker recognition system 32, and controller 33.

Microphone array processing module 31 may employ a conventional microphone array comprising a plurality of microphones 37-1, 37-2, . . . , 37-P, which receives a corresponding plurality of P signals. The processing of the received signals may, for example, advantageously operate as follows:

Suppose that at time instant k, there are M active speakers, whose speech signals are denoted, respectively, as $x_1(k)$, $x_2(k)$, . . . , and $x_M(k)$. Using the microphone array consisting of P microphones, the output of the p'th microphone may be written as $$y_p(k) = \sum_{m=1}^{M} h_{pm} * x_m(k) + w(k),$$

where p=1, 2, . . . , P, where $h_{pm}$ denotes the room impulse response from speaker m to microphone p, and where w(k) is the background noise. It can be seen from the equation above that each microphone output consists of signals from all of the M active speakers, as well as noise sources. As is well known to those of ordinary skill in the art, the objective of microphone array processing is to separate the speech signals from the microphone observations. Thus, mathematically, the objective of the microphone array processing in accordance with the illustrative embodiment of the present invention is to obtain M signal estimates, each of which consists (primarily) of the speech signal from one (and only one) active speaker. Without loss of generality, therefore, assume that the m'th estimate, $\hat{x}_m(k)$, denotes an estimate of the speech signal from the m'th speaker. Then, in accordance with various illustrative embodiments of the present invention, $\hat{x}_m(k)$ may advantageously comprise either an estimate of $x_m(k)$ or $g*x_m(k)$, where g denotes the equivalent channel between the m'th speaker and the beamforming output. The difference between these two results is that use of the former case achieves not only source separation and noise reduction, but also perfect speech de-reverberation, while the use of the later case has some degree of reverberation if g is not a Dirac delta function. (Note that Dirac delta functions are fully familiar to those of ordinary skill in the art.)

Figure 4:
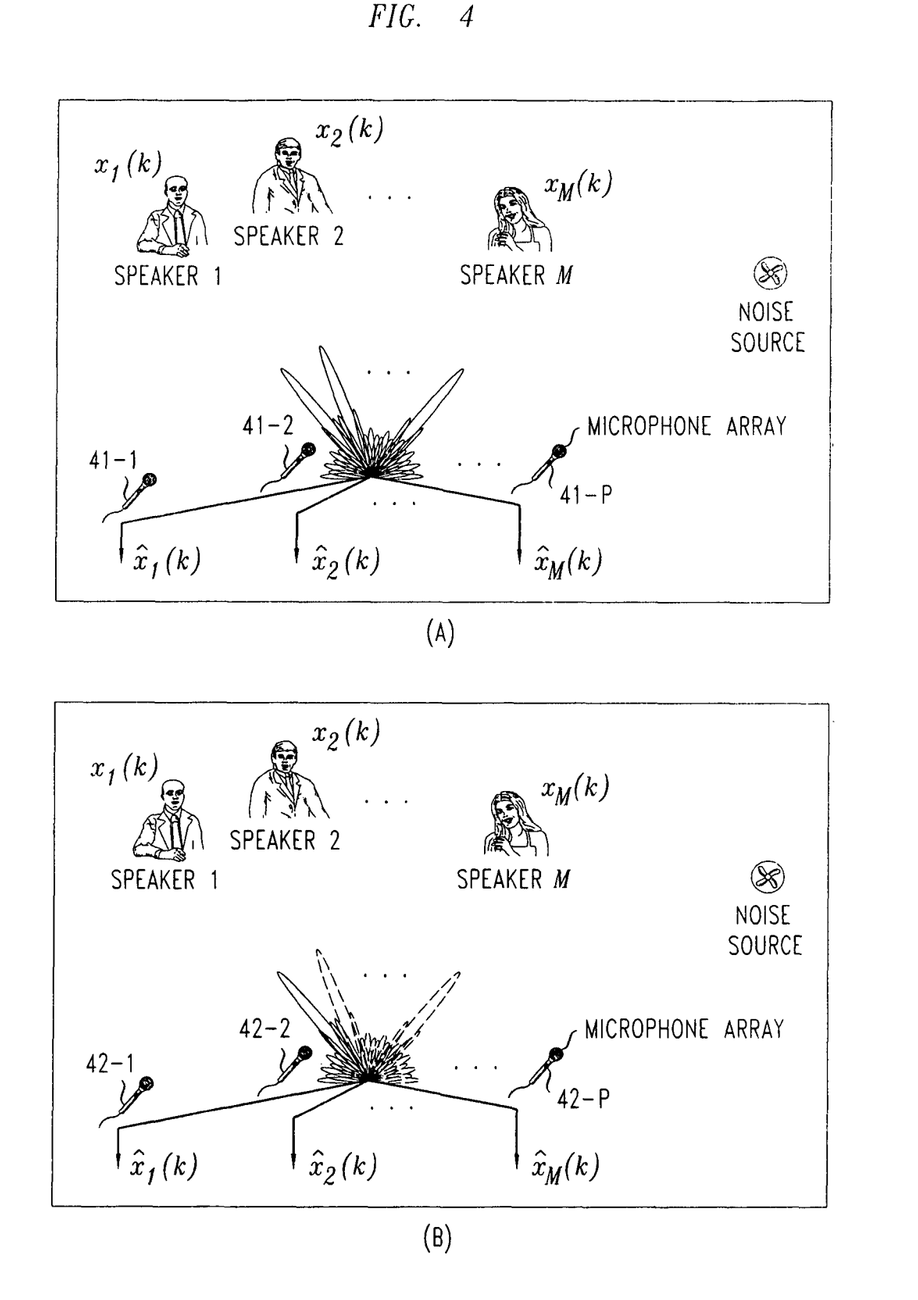
FIG. 4 shows an illustration of the use of microphone arrays which may be advantageously employed in accordance with various illustrative embodiments of the present invention.

The estimates $\hat{x}_m(k)$, where m=1, 2, . . . , M, may, in accordance with various illustrative embodiments of the present invention, be generated in at least two ways—with use of a multiple beam-forming technique or with use of a beam scanning technique. FIG. 4 shows an illustration of the use of microphone arrays which may be advantageously employed in accordance with these various illustrative embodiments of the present invention. First, FIG. 4A shows an illustrative multiple beam-forming technique which may be employed in accordance with one illustrative embodiment of the present invention. Specifically, as applied herein, the multiple-beam forming technique uses signals from microphones 41-1, 41-2, . . . , 41-P to simultaneously form M beams, with each beam advantageously pointing to one active speaker (as shown in the figure). Thus, as shown in the figure, M beamforming outputs are advantageously obtained at any given time instant.

FIG. 4B shows an illustrative beam-scanning technique which may be employed in accordance with another illustrative embodiment of the present invention. Specifically, and in contrast to the multiple-beam forming technique shown in FIG. 4A, the beam-scanning technique advantageously forms one beam at a time. In particular, as shown in the figure, using signals from microphones 42-1, 42-2, . . . , 42-P, it electronically re-steers the beam from one speaker to another at successive time instants. As such, the beam will advantageously move from the first active speaker to the M'th active speaker within one sampling period, and will then start over again (with the first active speaker).

Note that, in accordance with the principles of the present invention and in accordance with each of the illustrative embodiments thereof, both the multiple-beam forming and the beam scanning techniques will advantageously generate M signal estimates, $\hat{x}_m(k)$, at any time instant k. Note also that, in accordance with various other illustrative embodiments of the present invention, any other array beamforming or source separation technique may be alternatively used herein.

Returning to FIG. 3, the second major component of the illustrative embodiment of the present invention as described herein is speaker recognition system 32. In particular, each microphone array output (from microphone array processing module 31) is advantageously fed into a corresponding speaker recognition module. The purpose of performing speaker recognition is to automatically identify each of the active speakers based on information obtained from the corresponding speech waves.

In particular, illustrative speaker recognition system 32 comprises speaker database 34, which advantageously comprises both voice feature information and corresponding identity information (see discussion below) associated with each of a plurality of possible speakers. The voice feature information may be conventional and is described in more detail below (with reference to FIG. 5). Speaker database 34 may be advantageously pre-populated (i.e., prior to its use in performing active speaker selection in accordance with the illustrative embodiment of the present invention) with use of conventional "training" methods which store the voice feature information (and corresponding identity information) therein, such training methods being fully familiar to those of ordinary skill in the art. In addition, illustrative speaker recognition system 32 advantageously comprises a plurality of speaker recognition modules 35-1, 35-2, ..., 35-M, which may correspond to the M signal estimates, $\hat{x}_m(k)$, generated by microphone array processing module 31. In operation, each of these speaker recognition modules, 35-m, advantageously identifies the active speaker whose voice signal has been estimated by the corresponding output of microphone array processing module 31—i.e., $\hat{x}_m(k)$—with use of and with reference to speaker database 34.

Figure 5:
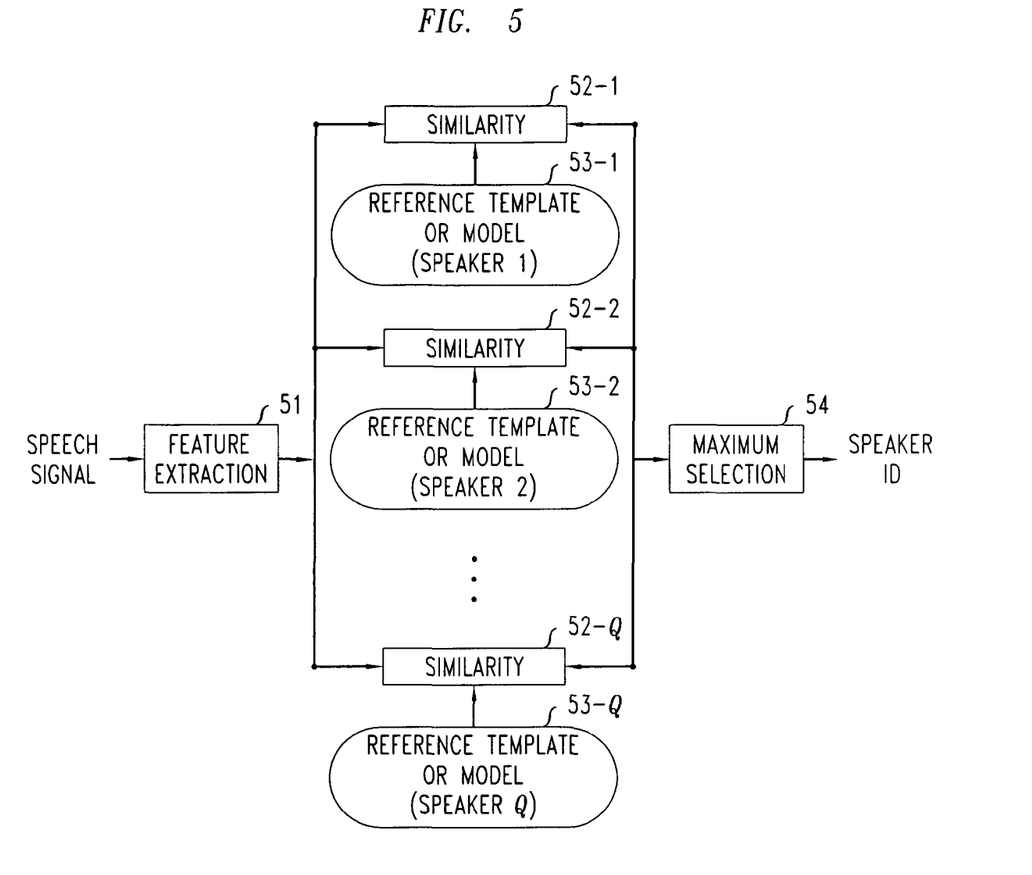
FIG. 5 shows a block diagram of a speaker recognition module which may be advantageously employed in accordance with an illustrative embodiment of the present invention.

More specifically, FIG. 5 shows a block diagram of a speaker recognition module which may be advantageously employed in accordance with an illustrative embodiment of the present invention. The first step thereof is performed by feature extraction module 51, which advantageously represents the input speech signal as a set of one or more voice features, such as, for example, short-term spectra, long-term spectra, signal energies, fundamental frequencies, etc. Such voice features and methods for extracting them from speech signals are wholly conventional and will be fully appreciated by those of ordinary skill in the art.

Then, a plurality of similarity modules 52-1, 52-2, ..., 52-Q advantageously compares the extracted features to corresponding voice feature information entries 53-1, 53-2, ..., 53-Q, each of which corresponds to a known (i.e., previously identified and characterized) speaker, which have been previously stored in speaker database 34. These stored voice feature information entries are known to those skilled in the art as "reference templates," and, as explained above, have been previously created (i.e., "trained") and stored in the speaker identity database. In accordance with one illustrative embodiment of the present invention, the set of (Q) reference templates which are compared to the extracted features may comprise those for all of the possible speakers which are stored in the speaker identity database, or, in accordance with other illustrative embodiments of the present invention, the set of reference templates used may be advantageously limited to a smaller set. For example, in accordance with one such illustrative embodiment of the present invention, only reference templates which are associated with participants of the particular teleconference meeting taking place may be used for this comparison.

The similarity measurement techniques performed by similarity modules 52-1, 52-2, ..., 52-Q may, for example, comprise any of a number of conventional methods for comparing voice feature information from a "target" speech signal to a given reference template, each of which is fully familiar to those of ordinary skill in the art. Such conventional methods include the use of dynamic time warping (DTW), hidden Markov models (HMM), and neural net (NN) based methods, among others.

Similarity modules 52-1, 52-2, ..., 52-Q advantageously produce a corresponding set of similarity "scores" (i.e., measures of the degree of similarity between the extracted features of the input voice signal and a given reference template), which may be ranked in order to identify the given active speaker as a particular one of the speakers whose identity is stored in the speaker database. In other words, the unknown speaker is advantageously identified as the speaker whose reference template best matches the features extracted from the input speech, as determined by maximum selection module 54, which determines the similarity score having the highest value and thereby determines the corresponding speaker's identity. Note that since the above-described speaker recognition procedure is applied to each of the (M) active speakers as captured by microphone array processing module 31, the operation of speaker recognition system 32 advantageously results in a set of M identified speakers. Also, note that in accordance with various other illustrative embodiments of the present invention, speaker recognition techniques other than those specifically described herein, many of which will be familiar to those of ordinary skill in the art, may be used instead.

As shown in FIG. 3, the third major component of the illustrative embodiment of the present invention as described herein is controller 33, which comprises transmitting controller module 36. Specifically, in accordance with the illustrative embodiment of the invention shown in the figure, after the identities of the M speakers have been determined by speaker recognition processing module 32, transmitting controller module 34 advantageously retrieves the respective speaker identity information corresponding to those identities from speaker database 34. The retrieved speaker identity information may, for example, include names, titles, photos, positions, affiliations, and/or other identifying indicia which may generally be associated with a given individual.

In accordance with one illustrative embodiment of the present invention, the retrieved speaker identity information for each of the corresponding active speakers may be advantageously sent by transmitting controller module 36 to one or more of the remote receiving rooms (i.e., the other rooms participating in the given teleconference). Then, in accordance with this illustrative embodiment of the present invention, the participants in a given remote receiving room will be able to view a list of the speaker identity information (or, possibly, selected items of speaker identity information, such as, for example, names or photos) for the active speakers. In particular, this information may be viewed on a conventional user interface device such as, for example, the display screen of a personal computer. Then, the participants in the given remote receiving room will advantageously be able to select (also with use of a conventional user interface device such as, for example, a mouse, keyboard, or other computer input device of a personal computer) a particular one of these speaker identities as identifying the particular active speaker to whom the participants in the given room wish to listen. This selection may then be advantageously sent back to transmitting controller module 36 (in the originating conference room), and based thereupon, transmitting controller module 36 may, in accordance with the principles of the present invention, send the selected speech signal, $\hat{x}_m(k)$, (i.e., the signal corresponding to the selected speaker identity) back to the given remote receiving room and to the participants therein.

In accordance with another illustrative embodiment of the present invention, transmitting controller module 36 may send the speech signals—that is, $\hat{x}_m(k)$—for all of the active speakers (m=1, 2, ..., M) to the remote receiving rooms—in addition to sending the corresponding retrieved speaker identity information for each speaker. Then, in accordance with this other illustrative embodiment of the present invention, the participants in each remote receiving room will be able to locally and directly select which one of the speech signals, $\hat{x}_m(k)$, of the active speakers is desired, again based upon a viewed list of the speaker identity information for the active speakers (which, again, may be displayed on a conventional user interface device such as, for example, the display screen of a personal computer, and wherein the selection may, again, be made with use of a conventional user interface device such as, for example, a keyboard, mouse, or other computer input device of a personal computer).

Note that, in accordance with various illustrative embodiments of the present invention, the participants in what is referred to herein as the remote receiving room need not comprise a plurality of individuals in a conference room. Rather, such remote participants may, for example, also comprise single individuals using individual personal telephone sets (such as, for example, POTS telephones, ISDN telephones, VoIP telephones, PC-based telephones and/or cellular/mobile telephones, each of which is fully familiar to those of ordinary skill in the art). As long as such individuals are provided an appropriate user interface (e.g., a personal computer or the individual's telephone itself) for viewing the active speaker list and for selecting one of those speakers to listen to, the principles of the present invention may be advantageously applied and the benefits thereof may be obtained. In addition, a variety of possible user interfaces (in addition to a personal computer) for viewing the active speaker list and for selecting a particular one of those speakers will be obvious to those skilled in the art. For example, a cellular telephone or "smart phone" may be used, a conventional telephone having a display screen may be used, or even a simple stand-alone special-purpose box (with a display) may be easily constructed for this purpose.

Addendum to the Detailed Description

It should be noted that all of the preceding discussion merely illustrates the general principles of the invention. It will be appreciated that those skilled in the art will be able to devise various other arrangements, which, although not explicitly described or shown herein, embody the principles of the invention, and are included within its spirit and scope. In addition, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future—i.e., any elements developed that perform the same function, regardless of structure.

What is claimed is:

1. A method for enabling selection of an active speaker during a teleconference, the active speaker to be selected from a plurality of active speakers participating in said teleconference and co-located at a given originating physical location, the selection of an active speaker to listen to at a remote physical location from the plurality of active speakers co-located at the given originating physical location to be made by a participant in the teleconference located at the remote physical location, the method comprising the steps of:

generating a plurality of estimated speech signals, each estimated speech signal comprising speech representative of a single one of said plurality of active speakers co-located at the given originating physical location;

performing speaker recognition on each of said estimated speech signals to generate corresponding speaker identities associated with the active speakers represented thereby;

transmitting a plurality of said speaker identities, each speaker identity corresponding to one of said estimated speech signals associated with the plurality of active speakers, to said remote physical location; and transmitting one or more of said estimated speech signals to said remote physical location, wherein each of said estimated speech signals is selectable by the participant.

2. The method of claim 1 further comprising the step of receiving from said remote physical location, in response to said step of transmitting said plurality of speaker identities thereto, a selection of one of said speaker identities, and wherein the step of transmitting said one or more estimated speech signals to said remote physical location comprises transmitting only the estimated speech signal which corresponds to said selected speaker identity thereto.

3. The method of claim 1 wherein the step of transmitting said one or more estimated speech signals to said remote physical location comprises transmitting all of the estimated speech signals corresponding to all of said transmitted plurality of speaker identities thereto.

4. The method of claim 1 wherein the step of generating said plurality of estimated speech signals is performed with use of a plurality of microphones located at said given originating physical location and further with use of a multiple beam-forming microphone array processing technique.

5. The method of claim 1 wherein the step of generating said plurality of estimated speech signals is performed with use of a plurality of microphones located at said given originating physical location and further with use of a beam scanning microphone array processing technique.

6. The method of claim 1 wherein the step of performing speaker recognition on each of said estimated speech signals is performed with use of a pre-populated speaker database which comprises voice feature information and speaker identity information associated with each of a plurality of possible speakers, and wherein the speaker identities associated with the active speakers are generated by comparing voice feature information extracted from said estimated speech signals to said voice feature information comprised in said speaker database and associated with a plurality of said possible speakers included therein.

7. The method of claim 6 wherein the voice feature information comprises one or more of short-term spectra information, long-term spectra information, signal energy information and fundamental frequency information.

8. The method of claim 6 wherein the speaker identity information comprises one or more of names, titles, photos, positions and affiliations.

9. A method for performing selection of an active speaker during a teleconference, the active speaker to be selected from a plurality of active speakers participating in said teleconference and co-located at a given originating physical location, the selection of the active speaker to listen to at a remote physical location from the plurality of active speakers co-located at the given originating physical location performed by a participant in the teleconference located at the remote physical location, the method comprising the steps of:

receiving, from said given originating physical location, a plurality of speaker identities generated by speaker recognition, each speaker identity corresponding to one of said plurality of active speakers located at said given originating physical location;

selecting, at the remote physical location, one of said received speaker identities corresponding to one of the plurality of active speakers to whom the participant at the remote physical location wants to listen;

receiving, from said given originating physical location, one or more estimated speech signals, each received estimated speech signal corresponding to one of said plurality of active speakers located at said given originating physical location, said one or more received estimated speech signals including the estimated speech signal corresponding to the active speaker which corresponds to the selected one of said received speaker identities; and outputting through a loudspeaker, at the remote physical location, the estimated speech signal corresponding to the active speaker which corresponds to the selected one of said received speaker identities.

10. The method of claim 9 further comprising the step of transmitting the selected one of said received speaker identities back to the given originating physical location, and wherein the step of receiving one or more estimated speech signals comprises receiving only the estimated speech signal corresponding to the active speaker which corresponds to the selected one of said received speaker identities.

11. The method of claim 9 wherein the step of receiving one or more estimated speech signals comprises receiving all of said estimated speech signals corresponding to active speakers which correspond to all of said received speaker identities, and wherein the step of selecting one of said received speaker identities further comprises selecting the estimated speech signal corresponding to the active speaker which corresponds to the selected one of said received speaker identities for said outputting through said loudspeaker.

12. The method of claim 9 wherein the received speaker identities comprise one or more of names, titles, photos, positions and affiliations.

13. The method of claim 9 further comprising the step of displaying said received speaker identities on a visual display at said remote physical location.

14. The method of claim 13 wherein the visual display is associated with a personal computer and wherein the step of selecting one of said received speaker identities is performed with use of a computer input device also associated with said personal computer.

15. An apparatus for enabling selection of an active speaker during a teleconference, the active speaker to be selected from a plurality of active speakers participating in said teleconference and co-located at a given originating physical location, the selection of an active speaker to listen to at a remote physical location from the plurality of active speakers co-located at the given originating physical location to be made by a participant in the teleconference located at the remote physical location, the apparatus comprising:

a plurality of microphones;

a microphone array processor operable to generate, based on signals from said plurality of microphones, a plurality of estimated speech signals, each estimated speech signal comprising speech representative of a single one of said plurality of active speakers co-located at the given originating physical location;

a speaker recognition system operable to perform speaker recognition on each of said estimated speech signals to generate a corresponding speaker identity associated with the active speaker represented thereby; and a transmitter operable to transmit a plurality of said speaker identities, each speaker identity corresponding to one of said estimated speech signals, to said remote physical location, the transmitter further operable to transmit one or more of said estimated speech signals to said remote physical location.

16. The apparatus of claim 15 further comprising a receiver operable to receive from said remote physical location, in response to said transmitting of said plurality of speaker identities thereto, a selection of one of said speaker identities, and wherein the transmitter is operable to transmit to said remote physical location the estimated speech signal corresponding to said selected speaker identity.

17. The apparatus of claim 15 wherein the transmitter is operable to transmit all of the estimated speech signals corresponding to all of said plurality of speaker identities to said remote physical location.

18. The apparatus of claim 15 wherein the microphone array processor is operable to generate said plurality of estimated speech signals with use of a multiple beam-forming microphone array processing technique.

19. The apparatus of claim 15 wherein the microphone array processor is operable to generate said plurality of estimated speech signals with use of a beam scanning microphone array processing technique.

20. The apparatus of claim 15 wherein the speaker recognition system is operable to perform speaker recognition on each of said estimated speech signals with use of a pre-populated speaker database which comprises voice feature information and speaker identity information associated with each of a plurality of possible speakers, and wherein the speaker recognition system is further operable to generate the speaker identities associated with the active speakers by comparing voice feature information extracted from said estimated speech signals to said voice feature information comprised in said speaker database and associated with a plurality of said possible speakers included therein.

* * * * *